United States Patent [19]
Brown et al.

[11] Patent Number: 5,527,449
[45] Date of Patent: * Jun. 18, 1996

[54] CONVERSION OF WASTE OILS, ANIMAL FATS AND VEGETABLE OILS

[75] Inventors: Stanton D. Brown, Rte. 6, Box 325, Waco, Tex. 76706; Michael M. Wentworth; Ronald D. Marstaller, both of Waco; Jerry A. Bullin, Bryan, all of Tex.

[73] Assignee: Stanton D. Brown, Waco, Tex.

[*] Notice: The term of this patent shall not extend beyond the expiration date of Pat. No. 5,362,381.

[21] Appl. No.: 329,182

[22] Filed: Oct. 26, 1994

Related U.S. Application Data

[63] Continuation-in-part of Ser. No. 36,705, Mar. 25, 1993, Pat. No. 5,362,381.

[51] Int. Cl.⁶ .................................................... C10G 7/00
[52] U.S. Cl. ..................... 208/179; 208/184; 208/106; 196/46; 196/100; 196/117; 196/139
[58] Field of Search ............................. 208/179, 184, 208/106; 196/46, 100, 117, 139

[56] References Cited

U.S. PATENT DOCUMENTS

| | | | |
|---|---|---|---|
| 342,564 | 5/1886 | Benton. | |
| 342,565 | 5/1886 | Benton. | |
| 1,664,977 | 4/1928 | Hanna | 196/100 |
| 1,838,718 | 12/1931 | Stutler | 208/184 |
| 1,886,621 | 11/1932 | Bagwill | 196/117 |
| 1,909,335 | 5/1933 | Brewster et al. | 196/100 |
| 1,911,114 | 5/1933 | Gard et al. | 196/100 |
| 1,927,652 | 9/1933 | Stratford | 196/100 |
| 1,993,344 | 3/1935 | Jacobson | 196/117 |
| 3,954,602 | 5/1976 | Troesch et al. | |

(List continued on next page.)

FOREIGN PATENT DOCUMENTS

| | | |
|---|---|---|
| 37728 | 2/1886 | Germany. |
| 260858 | 10/1911 | Germany. |
| 3134520 | 5/1982 | Germany. |
| 158254 | 1/1983 | Germany. |

OTHER PUBLICATIONS

Bacon, R. F., "The American Petroleum Industry", McGraw–Hill Book Company, Inc. p. 557 (1916) no month.
Kitzen et al., "Gas Oil Pyrolysis in Tubular Reactors", Chemical Engineering Progress, vol. 65, No. 7, pp. 71–76 (1969) Jul.
Marshall et al., "Gas Oil Feedstocks for Ethylene Production", Chemical Engineering Progresss, vol. 65, No. 10, pp. 65–73 (1969) Oct.

(List continued on next page.)

*Primary Examiner*—Marianne Padgett
*Attorney, Agent, or Firm*—James Creighton Wray

[57] ABSTRACT

Waste lubricating oil, vegetable oil and animal fat are reprocessed into commercially usable diesel fuel and naphtha by thermocracking. A thermocracker unit is fired with sludge removed from the principal pool of oil or fat undergoing vaporization. The vapors are separated from liquids in a primary distillation tower with precisely controlled heating. Resultant vapors are partially condensed. Resultant liquids flow downward through a secondary distillation tower into a reboiler which is heated by a flue gas bypass with an auxiliary burner. Vapors leaving the secondary distillation tower are partially condensed and resultant fluids are passed to a light ends flash tank. Gases from the flash tank fuel the auxiliary burner. Liquids are collected and stored for selling as naphtha. Hot liquids are withdrawn from the reboiler and are immediately cooled to atmospheric conditions. Liquids within specification are stored in a diesel storage tank for further use and sale. Off-specification products are stored in a reflux storage tank and are pumped and heated and sprayed downward in the primary distillation tower for washing the tower and for reprocessing in the thermocracking unit. Some light ends are mixed with sludge in a storage tank. The mixture is pumped as sludge fuel to the burner in a fire tube in the thermocracking unit.

18 Claims, 2 Drawing Sheets

U.S. PATENT DOCUMENTS

| | | | |
|---|---|---|---|
| 4,033,859 | 7/1977 | Davidson et al. | |
| 4,594,461 | 6/1986 | Jeromin et al. | 534/175 |
| 4,623,448 | 11/1986 | O'Connell et al. | 196/46 |
| 4,784,751 | 11/1988 | McGehee. | |
| 4,894,140 | 1/1990 | Schon. | |
| 4,904,345 | 2/1990 | McCants | 196/117 |
| 4,941,967 | 7/1990 | Mannetje et al. | |
| 5,049,258 | 9/1991 | Keim et al. | |
| 5,215,630 | 6/1993 | Hata et al. | 554/175 |
| 5,218,132 | 6/1993 | Mobbs et al. | 554/175 |
| 5,250,155 | 10/1993 | Zwanenburg et al. | 554/175 |
| 5,286,349 | 2/1994 | Shurtleff | 196/46 |
| 5,306,419 | 4/1994 | Harrison et al. | 208/184 |
| 5,382,328 | 1/1995 | Drespa et al. | 208/184 |
| 5,389,242 | 2/1995 | Lermite et al. | 196/100 |

OTHER PUBLICATIONS

Brooks et al., "The Preparation of Gasoline and Kerosene from Heavier Hydrocarbons", The Journal of Industrial and Engineering Chemistry, vol. 7, No. 3, pp. 180–186 (1915) no month.

"The Oil Industry", p. 415 no date, no source, no author.

Stephens et al., "Petroleum Refining Processes", Pennsylvania State University, pp. 201–202 (1956) no month.

J. Grant, ed. *Hackh's Chemical Dictionary*, McGraw–Hill Book Co., Inc., N.Y. 1944 (no month) pp. 591–592.

CONVERSION OF WASTE OILS, ANIMAL FATS AND VEGETABLE OILS

This is a continuation-in-part of application Ser. No. 08/036,705 filed Mar. 25, 1993, now Pat. No. 5,362,381, issued Nov. 8, 1994.

BACKGROUND OF THE INVENTION

Waste lubricating oil from automotive and industrial sources is an environmental problem. Waste lubricating oil has substantially no economic value. It is collected by service stations as a public service and transferred by bulk carrier to reprocessers who centrifuge and filter the oil and resell it as reprocessed lubricating oil, or who centrifuge and filter the oil and spray it into burners and industrial processors.

In both cases, remaining solids and sludge are an environmental hazard.

Animal fats and vegetable oils are extensively used in the food industry, and the impact of waste fats and oils is becoming a major concern in pollution control. The major problem of oils and fats in waste management is due to their insolubility in water. This characteristic presents a problem to the water and sewage treatment plants across the country.

Presently, there are no viable, sustainable and acceptable means for the disposal of fat and oil wastes from major food processing plants, restaurant chains, large institutions with food service and several other entities. Burial in landfills is not a viable, responsible method. It is estimated that by the year 2000 there will not be enough landfill space to bury half of U.S. municipal wastes. Efforts have progressed in the area of oil/fat conversion into diesel fuels. Those ventures have been limited by conversion difficulties and high production costs. Federal and state governments are demanding that industry address pollution and other environmental concerns and take measures to insure proper waste management and avoid health risks.

A need exists for a process to convert used lubricating oil and waste animal fats and vegetable oils into more economic products. A need exists to dispose of waste oil, vegetable oil and animal fat sludge in environmentally safe processes.

SUMMARY OF THE INVENTION

The present invention converts animal fats, vegetable oils, and waste oils such as used transmission and motor oils to products such as diesel and crude naphtha. The process involves thermally cracking the oils or fats into a variety of products, followed by a series of steps in distillation columns to separate the products into desirable forms such as gases, naphtha and diesel oils. The process is accomplished on a miniature scale ranging from 2 to 100 gallons per hour or higher and in a self-contained, transportable, compact form.

New, unexpected and critical results are obtained when the invention is applied to a miniature scale process for converting oils and fats to a variety of products.

Flanged heads and bases are provided on columns. The flanged heads and bases on the distillation columns allow for quick and easy removal for cleaning and other maintenance. Due to the tendency of those columns to become plugged, this feature is particularly novel and useful.

A flash separator is provided between the cracker and the primary distillation tower. As shown on the process flow diagram in FIG. 1, a flash separator is present between the thermal cracking unit and the primary distillation tower. The separator prevents entrainment of liquids from the primary pool to the primary tower. Cracker liquids have a strong tendency to plug a primary distillation tower over a fairly short period of time.

Supplemental heating is provided for the primary and secondary distillation towers. Due to the miniature scale of the process, heat losses to the surroundings can be excessive. Thus, supplemental heating in the form of electrical heating tapes or other devices are useful for the primary and secondary distillation towers.

The present invention uses waste gases, vegetable oils and animal fats as fuel. The use of waste gases, oils and fats which are generated in the cracking process as a fuel for the thermal cracking unit, secondary distillation column and other equipment is new. The use of the waste gas stream as a fuel eliminates air pollution and prevents waste of fuel. Excess flue gases, if any exist, are flared in the thermal cracking unit or in the reboiler for the secondary distillation tower.

An energy economizer is provided for the reboiler of the secondary distillation tower. Preferably a combination energy economizer and direct fired reboiler is used for the secondary distillation tower, as shown in FIG. 1. This combination permits the recovery of waste heat from the cracker flue gases and permits the supplemental direct firing using waste gases, fats and oils as needed to augment the heat recovered from the flue gases.

The invention provides the settling of sludge in the thermal cracking unit. In the cracking process small amounts of hydrocarbons heavier than the original fuel tend to be formed, and those must be removed from the thermal cracking unit to prevent excessive accumulations. As shown in FIG. 1, a special settling area has been added to collect and remove the heavier hydrocarbons and residues.

The present invention uses thermal cracking unit sludge as fuel. The use of the sludge from the thermal cracking unit is beneficial to the environment and to the economy of the invention. The use of the sludge stream greatly reduces and possibly eliminates all residual waste from the miniature waste oil conversion unit.

A flash separator recovers gases. As shown in FIG. 1, a flash separator is used to separate and collect the waste gases which are not condensable at ordinary temperatures and pressures. Those gases are used as fuel in the process.

The invention provides recovery of light ends liquids (naphtha) as a product. The light ends liquids are condensed in an overhead condenser and are separated from the gases in the light ends flash separator. The light ends liquids are recovered as a naphtha stream and are sold as product.

The invention uses several product coolers. Product coolers are shown as the overhead condensers and the product cooler in FIG. 1 and are used to immediately cool the products to reduce deterioration of product quality.

Liquid distributors are used in the distillation towers of the invention. Liquid distributors are used in both of the primary and secondary distillation towers to ensure proper liquid distribution over the column packing.

The cracker feed is semicontinuous. The semicontinuous feed to the thermal cracking unit is used to minimize the accumulation of sludge.

The invention uses off-specification products or diesel as reflux. The off-specification product or diesel is diverted to a separate storage tank and is used as reflux for the primary distillation tower. In this manner, the off-specification product or diesel is returned to the unit for washing down the distillation tower and for further processing.

This process and these concepts may be used in units with waste oil and fat feed rates of two gallons per hour and up. The process involves the thermal cracking of used oils and fats and subsequent separation of the cracked materials into selected products.

Waste lubricating oil, animal fats and vegetable oils are processed into commercially usable diesel fuel and naphtha by thermocracking. A thermocracker unit is fired with sludge removed from the principal pool of oil and fat undergoing vaporization. The vapors are separated from liquids in a primary distillation tower with precisely controlled heating. Resultant vapors are partially condensed. Resultant liquids flow downward through a secondary distillation tower into a reboiler which is heated by a flue gas bypass with an auxiliary burner. Vapors leaving the secondary distillation tower are partially condensed and resultant fluids are passed to a light ends flash tank. Gases from the flash tank fuel the auxiliary burner. Liquids are collected and stored for selling as naphtha. Hot liquids are withdrawn from the reboiler and are immediately cooled to atmospheric conditions. Liquids Within specification are stored in a diesel storage tank for further use and sale. Off-specification products are stored in a reflux storage tank and are pumped and heated and sprayed downward in the primary distillation tower for washing the tower and for reprocessing in the thermocracking unit. Some light ends are mixed with sludge in a storage tank. The mixture is pumped as sludge fuel to the burner in a fire tube in the thermocracking unit.

In a preferred process for converting oil and fats to fuel, oil and fats flow to a primary pool of a thermocracking unit. The primary pool is heated with a burner which produces a flame in a fire tube for heating the pool. A part of the oil and fat is vaporized above the heated pool. The heated vapor flows into a mist chamber. Condensed droplets return from the mist chamber to the primary pool. The vapor flows through a demister pad for removing entrained liquids and returning the liquids to the primary pool. The demisted vapor ascends through a primary distillation tower. Heating the distillation tower maintains heat of the vapor. Part of the vapor is condensed in the tower and returned to the primary pool. A remainder of the vapor flows to a first overhead condenser, which cools and condenses the vapor into a liquid and gas. The liquid descends through a secondary distillation tower into a secondary pool. The secondary pool is heated with flue gases bypassed from the fire tube stack. Fuel gas is burned in the bypass for further heating the secondary pool. A part of the liquid in the secondary pool vaporizes. Vapors from the secondary pool ascend through the secondary distillation tower. A portion of the vapor condenses in the secondary distillation tower and flows downward to the secondary pool. Non-condensed vapors partially condense in a second condenser. Fluids from the second overhead condenser flow to a light ends flash tank. Liquid light ends flow to a light ends liquid storage. Waste gases from the light ends flash tank are consumed as fuel gases by the auxiliary burner. Liquid from the secondary pool is cooled in a product cooler. Cooled liquids are sampled at a sample point. Within-specification liquids are stored in a diesel fuel storage tank. Off-specification liquids from the sample point are stored in a reflux storage tank. Reflux liquids from the reflex storage tank are heated and sprayed into the upper end of a primary distillation tower for washing down the primary distillation tower toward the primary pool. Sludge is collected at a bottom of the primary pool and is transferred to a sludge storage tank. Mixing the liquid light ends with the sludge creates sludge fuel for burning in the fire tube to heat the primary pool.

Vegetable oils and animal fat wastes, along with waste oil, can be used as raw materials in the thermal treatment system for the production of diesel fuels. The vegetable oil and animal fat is pre-processed to facilitate its conversion into diesel fuel. Once all organic compounds undesirable in the oil/fat to diesel conversion process are removed, the thermal treatment system detailed above for waste oil is followed. The bio-diesel produced has low emissions of particulate matter, carbon monoxide and hydrocarbons, very low toxicity, high biodegradability, higher cetane value than #2 diesel, higher lubricity than #2 diesel, marketable by-products, sustainability, and high performance.

The present invention allows for the production of a high quality fuel at a low cost. Unlike existing bio-diesel production methods, post-consumer, rather than pre-consumer, oils and fats are used as raw materials. Prices are lowered since the initial production costs of the raw materials have already been paid for.

The oil/fat to diesel fuel conversion process is environmentally friendly. Vegetable oils and animal fats have physical and chemical properties that make them recyclable and prime candidates as substitutes for gasoline and diesel. Those fats and oils can be recovered from waste streams and reused, thus decreasing U.S. dependency on foreign fuel suppliers. The present invention constitutes a sound, responsible and profitable venture in the overall national policy of natural renewable resource management. In addition to resource conservation, fuel produced using vegetable oils and animal fats has no sulfur or aromatic compounds and low exhaust emissions of carbon monoxide, hydrocarbons and black smoke particulates.

These and further and other objects and features of the invention are apparent in the disclosure, which includes the above and ongoing written specification, with the claims and the drawings.

DETAILED DESCRIPTION OF THE DRAWINGS

Figure 1:
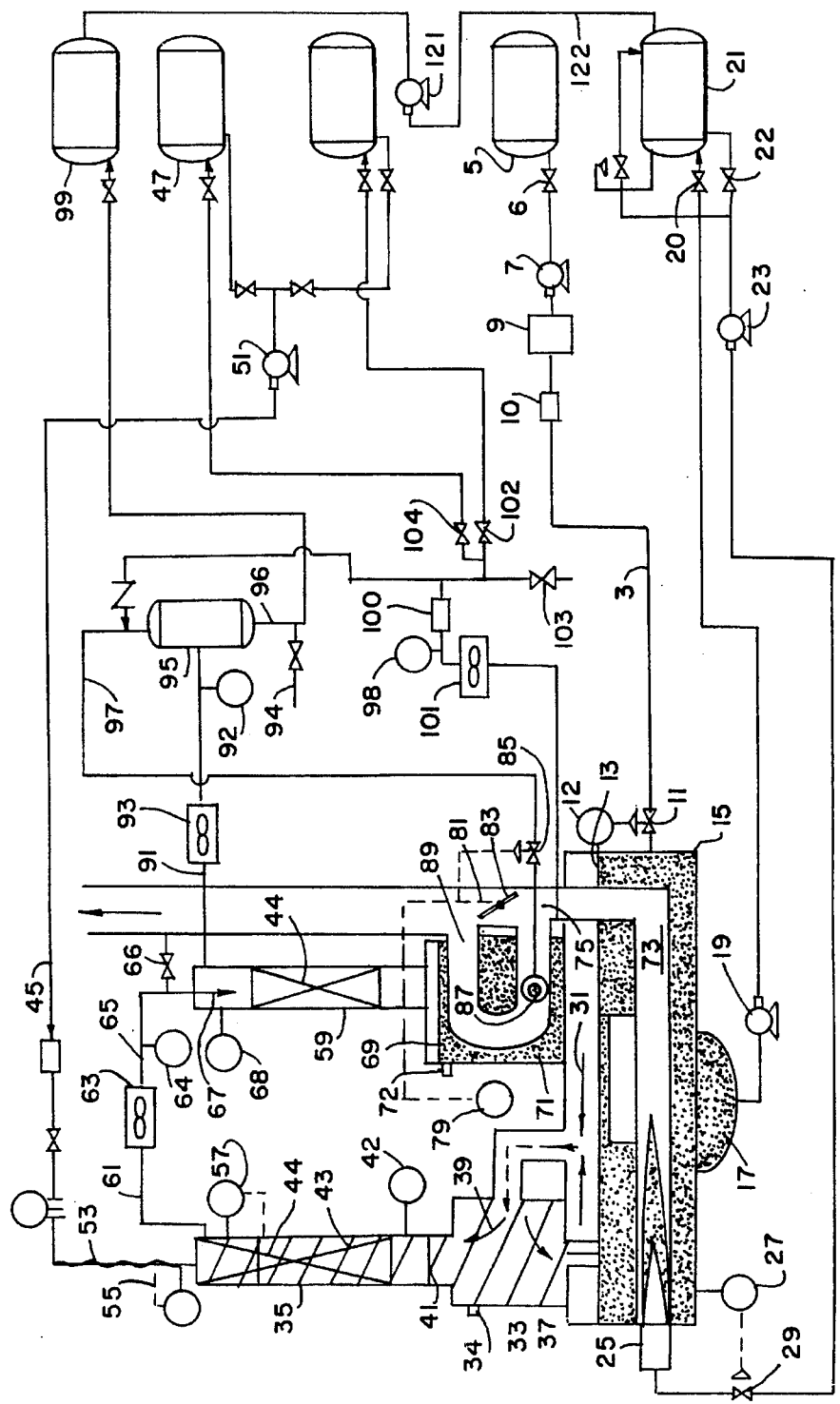
FIG. 1 shows an overall flow schematic of the process.

Referring to FIG. 1, the waste oil, animal fat and vegetable oil conversion system is generally indicated by the numeral 1.

Waste oil, vegetable oil or animal fat 3 is pumped from a storage tank 5 through a shut-off valve 6 by the waste oil feed pump 7 and through a filter 9, a flow totalizing meter 10 and a level control valve 11, which is controlled by a level indicating controller 12, to a primary pool 13 in the thermal cracking unit 15. The thermal cracking unit is operated in the range of 700° F. to 900° F. In the cracking process, the oil or fat is thermally cracked to a variety of lighter compounds.

As in all cracking processes, some compounds are formed which are heavier than the original feed material. These heavier compounds are usually called sludge or residue. In the present invention, they are collected in sump 17 and are withdrawn from the thermal cracking unit by the sludge withdrawal pump 19 through shut-off valve 20 and pumped to sludge storage 21.

The thermal cracking unit is heated by a direct fired burner using the oil or fat sludge as a fuel. The sludge is pumped from storage 21 through valve 22 by the sludge fuel pump 23 to the burner 25 on the thermal cracking unit 15. A temperature indicating sensor 27 controls valve 29 to control sludge fuel flow to the burner.

As shown in FIG. 1, the cracked compound vapors 31 in the thermal cracking unit 15 flow to the flash separator 33 in the base of the primary distillation tower 35. Relief valve 34 prevents overpressure. In the flash separator, any entrained liquids 37 fall to the base of the separator and are returned to the pool 13 of the thermal cracking unit 15. The vapors 39 pass through demister pad 41 and, flowing past temperature indicator 42, enter the primary distillation tower 35, where the heavier components are condensed and allowed to fall back into the thermal cracking unit for further cracking. Due to the miniature scale of the unit, an electrical heating tape 43 is used as a source of heat for temperature control on the primary distillation tower 35. Stainless steel screens 44 support half inch ceramic Intalox Saddles supplied by Norton Chemical as packing material in the towers.

Reflux 45 for the primary distillation tower may be obtained from off-specification diesel storage tank 47 or from diesel storage tank 49 via the reflux pump 51. The temperature of the reflux is controlled by a heating tape 53 and temperature indicator-controller 55. The overhead sensed temperature sensed at temperature indicating controller 57 on at sensor 57 of the primary distillation tower adjusts heat produced by heating tape 43 so as to produce a diesel product from the secondary distillation tower 59 with a 90% cutpoint at a maximum of 640° F.

The vapors 61 from the primary distillation tower flow to the overhead condenser 63 where they are partially condensed. A two-phase vapor-liquid fluid stream 65 then flows past a temperature indicator 64 and a sample point 66 to the secondary distillation tower 59 for separation of a diesel fuel product. The liquids 67 fall into the tower 59, post temperature indicator 68. The light ends are revaporized as they travel down the column and into a secondary pool 69 in the reboiler 71. Relief valve 72 prevents overpressure. The reboiler 71 recovers waste heat from the flue gases from the fire tube 73 flue 75 of the thermal cracking unit 15. Additional heat is provided to the reboiler 71 by an auxiliary burner 87 firing waste gases. The temperature of the reboiler is sensed by a sensor in a temperature indicator 79, which controls controller 81 to manipulate a damper 83 in the flue gas stack 75, and which controls the valve 85 for the auxiliary burner 87 in flue bypass 89.

The vapors 91 from the secondary distillation tower 59 flow to the overhead condenser 93 where they are partially condensed. The two-phase fluid stream flows past temperature indicator 92 to the light ends flash tank 95, where the vapors are separated from the liquids. The vapors are supplied as fuel gases 97 to the auxiliary burner 87 on the secondary distillation unit 71. The liquid light ends 96, or naphtha, flows past sample point 94 to the naphtha storage 99.

The bottom liquids or diesel products from the secondary distillation tower 59 flow to the product cooler 101, where they are quickly cooled to near ambient temperature, as measured at temperature indicator 98, to prevent deterioration of the product. From the product cooler, the diesel flows through flow totalizing meter 100 to sample point 103 and through valve 102 to the diesel storage tank 49. The diesel product may also be diverted through valve 104 to the reflux or off-specification diesel storage 47 during start-up or at other times when it does not meet diesel specification, as sampled at sample point 103. This reflux of off-specification diesel is used as reflux for the primary distillation tower 35 and thus is returned to the system for further processing.

Figure 2:
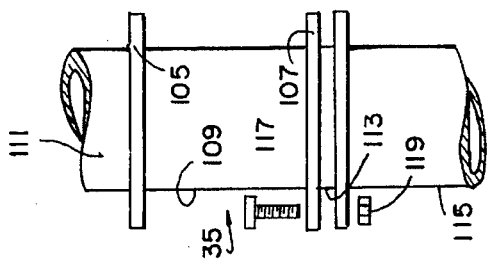
FIG. 2 schematically shows flange connections of the towers for removal, cleaning and replacement.

Referring to FIG. 2, in a preferred construction tower 35 is constructed of flanged elements to facilitate removal, cleaning and replacement of tower sections. Flanges 105 and 107 on main section 109 are connected to flanges on the top section 111 and to flanges on the demister section 113. The demister section is connected by flanges to the top of the separator section 115. Multiple bolts 117 and nuts 119 are used to connect the flanges. Gas tight interfits or seals are employed to make the flanged connections of the towers gas tight.

As shown in FIG. 1, pump 121 transfers some liquid light ends 122 to sludge storage tank 21 to mix with the sludge for creating a sludge fuel for burning in burner 25.

Figure 3:
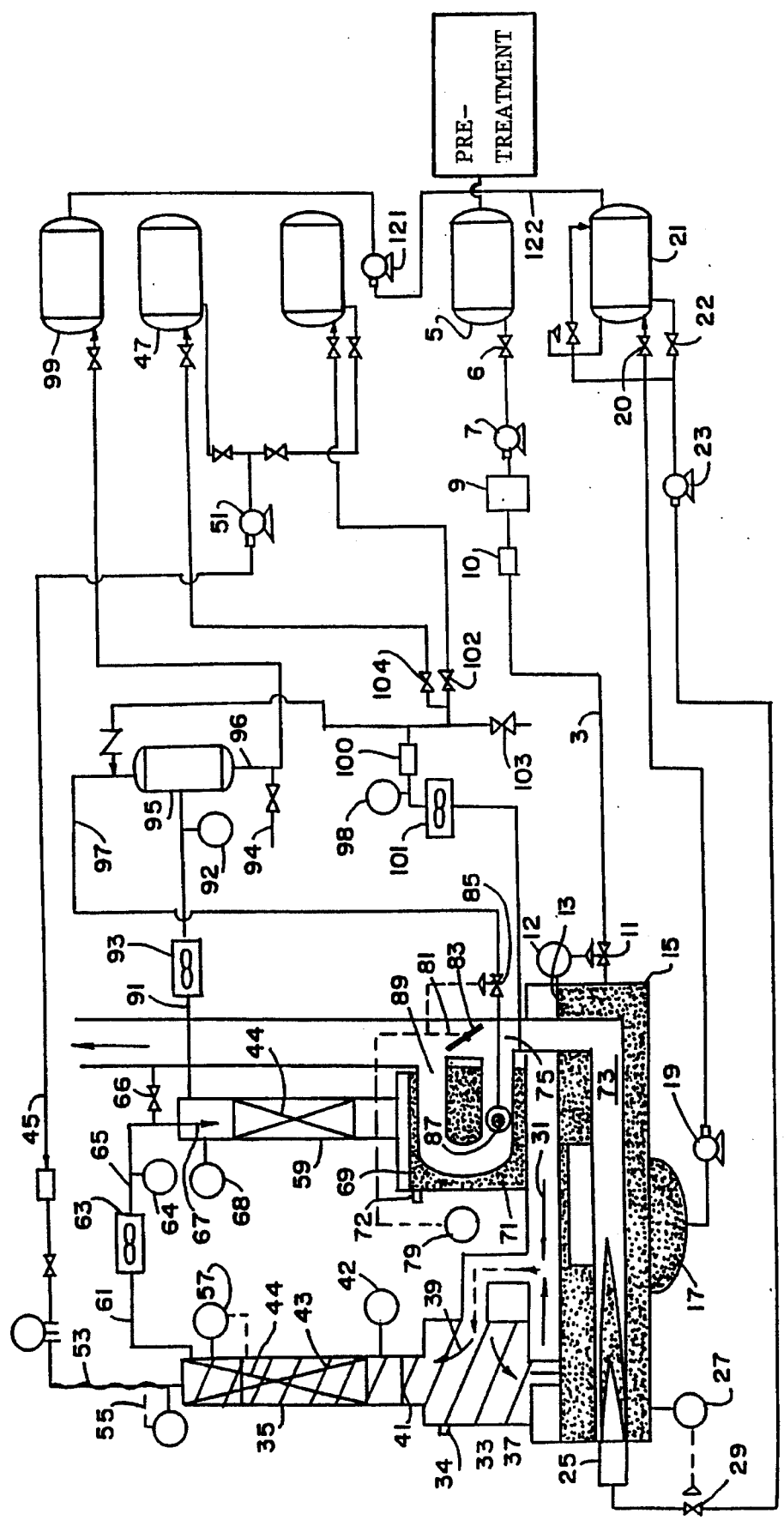
FIG. 3 shows an overall flow schematic of the process using vegetable oil or animal fat as the raw material.

When animal fat or vegetable oil 3 is the raw material for the conversion system 1, the raw material is preliminarily treated to remove organic compounds not desirable in the oil/fat to diesel conversion, as shown schematically in FIG. 3.

A combination of waste materials 3, such as a mixture of waste motor oils and waste vegetable oils, can be the input raw materials for the conversion system 1.

While the invention has been described with reference to specific embodiments, modifications and variations of the invention may be constructed without departing from the scope of the invention, which is defined in the following claims.

We claim:

1. A process for converting oils comprising waste oil or fat to fuel, comprising flowing oil or fat to a primary pool in a thermocracking unit, heating the primary pool with a primary burner by producing a flame in a fire tube within the thermocracking unit, vaporizing a part of the oil or fat above the heated pool, flowing the vapor through a primary distillation tower, maintaining heat of the vapor by heating the distillation tower, condensing a part of the vapor in the primary tower and returning the condensed part to the primary pool, flowing a remainder of the vapor to a first overhead condenser, cooling and condensing a part of the remainder of the vapor into a liquid, flowing the liquid downward through a secondary distillation tower into a secondary pool, heating the secondary pool with flue gases from the fire tube, combusting a fuel gas proximal the secondary pool for further heating the secondary pool, vaporizing a part of the liquid in the secondary pool and passing vapor from the secondary pool through the secondary distillation tower, condensing a portion of the vapor from the secondary pool in the secondary distillation tower and flowing the condensed portion downward to the secondary pool, flowing remaining vapor to a second overhead condenser, cooling the remaining vapor and condensing a part thereof, transferring the remaining vapor and the condensed part of the remaining vapor to a light ends flash tank to form liquid and gases, transferring the liquid from the light ends flash tank to a light ends liquid storage tank, flowing the gases from the light ends flash tank as fuel gases to an auxiliary burner, flowing liquid product from the secondary pool to a product cooler and cooling the liquid product, flowing the cooled liquid product to a sample point and sampling the cooled liquid product, flowing the cooled liquid product that is within-specification from the sample point to a diesel fuel storage tank, flowing off-specification liquid product from the sample point to a reflux storage tank, flowing the off-specification liquid from the reflux storage tank through a heater and into the upper end of the primary distillation tower and down through the primary distillation tower toward the primary pool, collecting sludge at a bottom of the primary pool and transferring the sludge from the primary pool to a sludge storage tank, flowing the sludge as fuel to the primary burner and burning the sludge in the fire tube for heating the primary pool, further comprising treating the waste oil or the fat prior to flowing the waste oil or the fat to the primary pool in the thermocracking unit, said treating allowing for removal of any unrequired organic compounds from the waste oil or the fat prior to the flowing in the thermocracking unit.

2. The process of claim 1, further comprising flowing the vapor from the primary pool into a mist chamber, returning condensed droplets from the mist chamber to the primary pool, flowing the vapor through a demister pad, removing entrained liquids from the vapor with the demister pad and returning the liquids to the primary pool before flowing the vapor into the primary tower.

3. The process of claim 1, further comprising transferring the liquid from the light ends storage tank to the sludge storage tank and mixing the liquid with the sludge for creating sludge fuel.

4. The process of claim 1, wherein the waste oil or fat comprises vegetable oil.

5. The process of claim 1, wherein the waste oil or fat comprises animal fat.

6. Thermal cracking apparatus for converting waste oil, vegetable oil and animal fat for diesel fuel, comprising a thermal cracking unit having a primary pool and a primary distillation tower above the primary pool, a waste oil or fat storage tank connected to the primary pool for supplying the waste oil or the fat to the primary pool, a first heater within the primary pool for heating the primary pool and vaporizing the waste oil or the fat, and a means for flowing waste oil or fat vapors into the primary distillation tower, a condenser connected to the primary distillation tower for condensing vapors flowing from the primary distillation tower, the thermal cracking unit further having a secondary pool and a second distillation tower connected to the secondary pool and connected to an overhead condenser for receiving condensed liquid from the overhead condenser, and means for flowing the condensed liquid from the overhead condenser downward through the second distillation tower to the secondary pool, a second heater for heating the secondary pool, a second condenser connected to the second distillation tower for condensing vapors flowing out of the second distillation tower, a light ends flash tank connected to the second condenser for receiving fluid therefrom, a liquid light ends storage tank connected to the light ends flash tank, a product cooler connected to the secondary pool for cooling product from the secondary pool, and a sampling point withdrawal means connected to the product cooler, a diesel fuel storage tank connected to the sampling point withdrawal means for storing within-specification product from the sampling point withdrawal means as diesel fuel, a reflux storage tank connected to the sampling point withdrawal means for storing off-specification product as reflux, a reflux supply line connected to the reflux storage tank and to a top of the primary distillation tower for supplying reflux to the primary distillation tower, a sludge collector connected to the primary pool, and a sludge storage tank connected to the sludge collector for receiving sludge from the sludge collector, further comprising a pre-treatment tank for pre-treating the waste oil or the fat prior to flowing the waste oil or the fat to the primary pool in the thermocracking unit, said pre-treatment tank removing any unwanted organic compounds from the waste oil or the fat prior to flowing into the termocracking unit.

7. The apparatus of claim 6, further comprising a primary burner connected to the first heater, and a sludge fuel line connected from the sludge storage tank and to the primary burner for supplying fuel to the primary burner.

8. The apparatus of claim 7, wherein the first heater comprises a fire tube and the second heater comprises a flue within the secondary pool and connected to the fire tube for transferring waste gases from the fire tube to the flue, a second burner in the flue, and a fuel gas line connected to the light ends flash tank and to the second burner for supplying fuel gas from the flash tank to the second burner.

9. The apparatus of claim 4, further comprising a light ends line connected to the lights ends storage tank and to the sludge storage tank for mixing light ends with the sludge in the storage tank for producing sludge fuel.

10. The apparatus of claim 6, wherein the waste oil or fat comprises vegetable oil.

11. The apparatus of claim 6, wherein the waste oil or fat comprises animal fat.

12. In a waste oil or fat recycling refining system, having a thermal cracking unit having an internal fire tube and a distillation tower, the improvement comprising a reboiler, and a secondary distillation column connected to the tower for receiving products from the tower, said reboiler having an internal flue connected to the fire tube for reboiling the products from the tower with waste heat from the fire tube of the thermal cracking unit, a flash tank connected to the secondary column for condensing liquids and separating waste gases from products of the secondary column, and a burner connected to the flash tank and mounted in the flue of the reboiler for burning the waste gases and supplementing heating of the reboiler, further comprising a pre-treatment tank for pre-treating the waste oil or the fat prior to flowing waste oil or fat to the primary pool in the thermocracking unit, said pre-treating allowing for removal of any unrequired organic compounds from the waste oil or the fat prior to flowing into the thermocracking unit.

13. The system of claim 8, further comprising a light ends collection tank connected to the flash tank for storing liquid light ends from the flash tank.

14. The system of claim 12, wherein the waste oil or fat comprises vegetable oil.

15. The system of claim 12, wherein the waste oil or fat comprises animal fat.

16. A process for converting oils comprising waste oil or fat to fuel, comprising flowing oil or fat to a primary pool in a thermocracking unit, heating the primary pool with a primary burner by producing a flame in a fire tube within the thermocracking unit, vaporizing a part of the oil or fat above the heated pool, flowing the vapor through a primary distillation tower, maintaining heat of the vapor by heating the distillation tower, condensing a part of the vapor in the primary tower and returning the condensed part to the primary pool, flowing a remainder of the vapor to a first overhead condenser, cooling and condensing a part of the remainder of the vapor into a liquid, flowing the liquid downward through a secondary distillation tower into a secondary pool, heating the secondary pool with flue gases from the fire tube, combusting a fuel gas proximal the secondary pool for further heating the secondary pool, vaporizing a part of the liquid in the secondary pool and passing vapor from the secondary pool through the secondary distillation tower, condensing a portion of the vapor from the secondary pool in the secondary distillation tower and flowing the condensed part of the remaining vapor downward to the secondary pool, flowing remaining vapor to a second overhead condenser, cooling the remaining vapor and condensing a part thereof, transferring the remaining vapor and the condensed portion to a light ends flash tank to form liquid and gases, transferring the liquid from the light ends flash tank to a light ends liquid storage tank, flowing the gases from the light ends flash tank as fuel gases to an auxiliary burner, flowing liquid product from the secondary pool to a product cooler and cooling the liquid product, flowing the cooled liquid product to a sample point and sampling the cooled liquid product, flowing the cooled liquid product that is within-specification liquid product from the sample point to a diesel fuel storage tank, flowing off-specification liquid product from the sample point to a reflux storage tank, flowing the off-specification liquid from the reflux storage tank through a heater and into the upper end of the primary distillation tower and down through the primary distillation tower toward the primary pool, collecting sludge at a bottom of the primary pool and transferring the sludge from the primary pool to a sludge storage tank, flowing the sludge as fuel to the primary burner and burning the sludge in the fire tube for heating the primary pool, wherein the waste oil or the fat are converted to the fuel simultaneously in the converting process.

17. The process of claim 11, wherein the waste oil or fat comprises vegetable oil.

18. The process of claim 11, wherein the waste oil or fat comprises animal fat.

* * * * *